United States Patent

[11] 3,527,188

| [72] | Inventors | John D. Shepard<br>Rte. 1, P.O. Box 10, Troy, Illinois 62294;<br>Normal D. Shepard, Rte. 1, P.O. Box 10,<br>Troy, Illinois 62294 |
|---|---|---|
| [21] | Appl. No. | 736,692 |
| [22] | Filed | June 13, 1968 |
| [45] | Patented | Sept. 8, 1970 |

[54] POWER-PRODUCING MEANS FOR VESSELS
4 Claims, 4 Drawing Figs.

[52] U.S. Cl. ............................................. 115/4
[51] Int. Cl. ....................................... B63h 19/02
[50] Field of Search ................................. 115/4; 253/11

[56] References Cited
UNITED STATES PATENTS

| 1,018,678 | 2/1912 | Nelson ........................ | 253/11X |
| 2,364,535 | 12/1944 | Kapolkin ..................... | 115/4 |
| 2,477,691 | 8/1949 | Griffin ......................... | 115/4X |
| 3,002,484 | 10/1961 | Dube ........................... | 115/4X |

FOREIGN PATENTS

| 121,386 | 12/1918 | Great Britain ........... | 115/4 |

Primary Examiner—Andrew H. Farrell
Attorney—Cohn and Powell

ABSTRACT: The power-producing means includes front and rear hull portions of a vessel coupled together by a transversely disposed hinge member. A pair of plunger and cylinder assemblies are vertically spaced from the hinge, each plunger being attached to one portion of the hull and each cylinder being attached to the other portion of the hull. The plungers are received within the cylinders as the hull portions rotate about the hinge member in response to the undulating motion of the water whereby to translate such energy motion into useful work.

Patented Sept. 8, 1970

3,527,188

Inventors
JOHN D. SHEPARD
NORMAN D. SHEPARD

By Cohn and Powell
Attorneys

POWER-PRODUCING MEANS FOR VESSELS

BACKGROUND OF THE INVENTION

This invention refers generally to the production of power from ocean swell and wave motion and, in particular to the conservation of energy resulting from wave action on a floating vessel.

The natural movement of rivers, seas and oceans have long been regarded as a prime source of energy. However, although the available power is practically limitless, the difficulty of tapping it has proved a deterent in the development of this form of power.

Various devices exist which derive power from wave motion, such as occurs with tidal action, ocean swell and the like, but, in general, the devices in the known art are stationery in that they are invariably moored to a buoy or mounted on a permanent structure, such as a pier.

In the usual situation, a buoyant body rises and falls with the wave action and adjusts a balance weight, thereby storing potential energy. Alternatively, the swinging motion of shore waves has been utilized by transmitting this motion directly to large blades swung from a pier or other structure.

Obviously, there are many advantages to be gained from utilizing the undulating motion of natural bodies of water. As a fuel substitute, it is cost free; it presents no pollution problem and the supply is unlimited.

SUMMARY OF THE INVENTION

The power-producing means described herein may be utilized with a moving, water-borne vessel and is not limited to a moored assembly.

Although normal ship construction is modified to the extent necessary to permit hinge and piston operation, the over-all profile is that of a conventional vessel. The cross section will likewise be substantially conventional and permit storage capacity comparable to that offered by any vessel of like tonnage.

The power-producing means includes a pair of bodies including at least one floating body adapted to rise and fall in response to the swell of the ocean, the bodies being coupled together in pivotal relation. An arm is disposed in spaced relation from the coupling means and extends between the bodies, the arm including opposed ends, one end being connected to one body to permit the arm to move in response to the relative movement of the body. Translation means carried by the other body engages the other end of the arm and translates movement of the arm into power.

A powered vessel including front and rear portions provides the body, and the coupling means includes a transverse hinge interconnecting the front and rear portions.

The arm includes a plunger aligned with the length of the vessel, and the translation means includes a hydraulic cylinder cooperating with the plunger, the plunger being pivotally connected to said other body. The longitudinal axis of the plunger is oriented substantially perpendicularly to the axis of rotation of the hinge. A hydraulic circuit receives fluid from the hydraulic cylinder, the circuit including a hydraulic motor, and an electric generator is coupled to the hydraulic motor to produce electric power assisting the operation of the powered vessel.

DESCRIPTION OF THE PREFERRED EMBODIMENT

Figure 2:
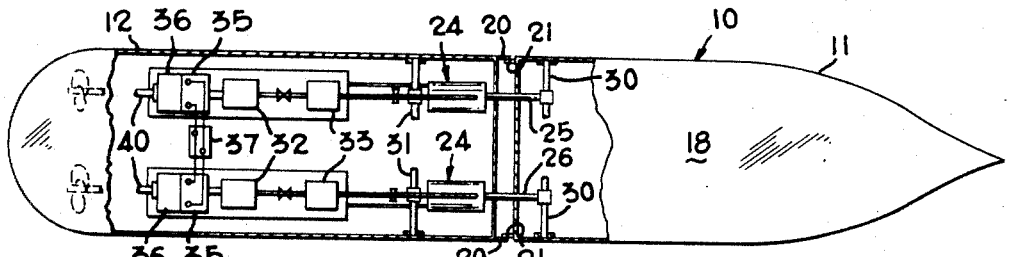
FIG. 2 is a plan view as taken on staggered line 2—2 of FIG. 1.
Figure 1:
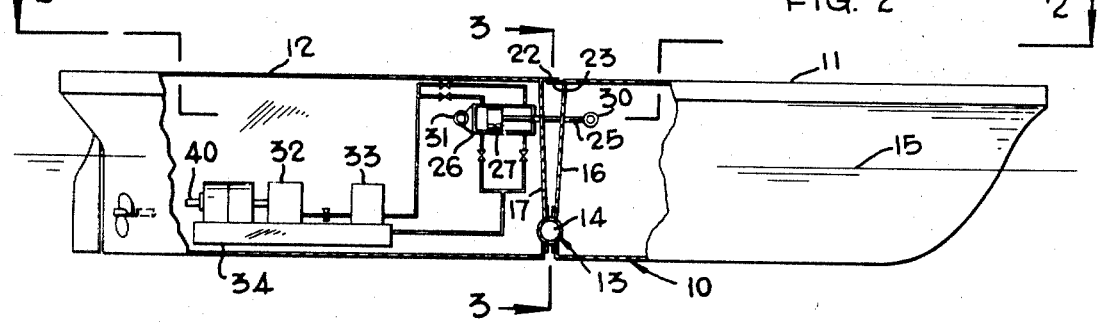
FIG. 1 is a side elevational view with the hull partially exposed to reveal the hinge and plunger mechanism.
Figure 3:
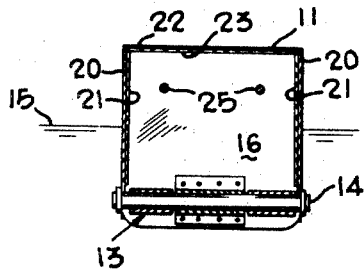
FIG. 3 is a cross sectional view as taken on line 3—3 of FIG. 1.

Referring now by characters of reference to the drawing and first to FIG. 1, it will be understood the power-producing means is embodied in the hull 10 of a water-borne vessel such as a passenger ship or tanker.

The hull 10 is divided into fore and aft portions 11 and 12 respectively which are coupled together by a transverse hinge member, generally shown by number 13. The hinge member 13 includes a pin 14 having an axis of rotation disposed below the water line 15. The fore and aft portions 11 and 12 of the hull 10 constitute a pair of bodies, each of which may rise and fall relative to the other by rotational movement about the axis of the hinge pin 14.

It will be understood that the fore portion 11 includes an end bulkhead 16 and that the aft portion 12 includes an opposing end bulkhead 17. The hinge member 13 is mounted on each of the bulkheads 16 and 17 in order to perform its coupling function.

Overlapping side plates 20 and 21 extend inwardly between the fore and aft portions 11 and 12 in order to provide a closure between the two portions of the hull 10. These sliding plates 20 and 21 extend vertically substantially from the deck 18 to the hinge member 13 and provide the vessel with an outwardly conventional appearance. Deck closure plates 22 and 23 perform a similar function for the deck 18, and in addition permit traffic to move normally across the gap between the two portions of the hull 10.

A pair of plunger and cylinder assemblies 24 are disposed in side-by-side relation, substantially symmetrically about the longitudinal axis of the hull 10. Each assembly 24 includes a plunger 25 extending longitudinally of the hull 10, and a cylinder 26, constituting a power translation means, into which the piston head 27 of the plunger 25 is received.

Each plunger 25 is pivotally mounted to the fore portion 11 by a transverse shaft 30. The shaft 30 is connected to the plunger 25 at the end of plunger 25 remote from the piston head 27 and the shaft 30 is attached to the fore portion 11 of the hull 10. Similarly, each cylinder 26 is pivotally attached to the aft portion 12 of the hull 10 by a shaft 31. Obviously, the shafts 30 and 31 may extend across the width of the hull 10 or may be secured to interior longitudinal bulkheads 16 and 17.

The plunger and cylinder assemblies 24 are preferably of the double-acting variety. In operation, motion is induced into the assemblies 24 by rotation of hull portions 11 and 12 about the hinge pin 14. Each assembly 24 supplies fluid to an associated hydraulic motor 32 by way of hydraulic accumulators 33. From the hydraulic motor 32, the fluid passes to a reservoir 34 and thence is returned to the cylinders 26.

The hydraulic motor 32 is utilized to drive an electric generator 35 which is, in turn, utilized to power an electric motor 36. The generator also feeds a storage battery 37. The output drive shaft 40 of the electric motor 36 may be used to provide a prime mover for the various auxiliary systems in the ship, and the generator - battery combination may, in addition to supplying the electric motor 36, supply electricity for lighting and the like. Power from the motor 36 may also be utilized to assist in propulsion of the vessel. The hydraulic and electrical systems may be mounted on the reservoir 34 for convenience of arrangement.

Figure 4:
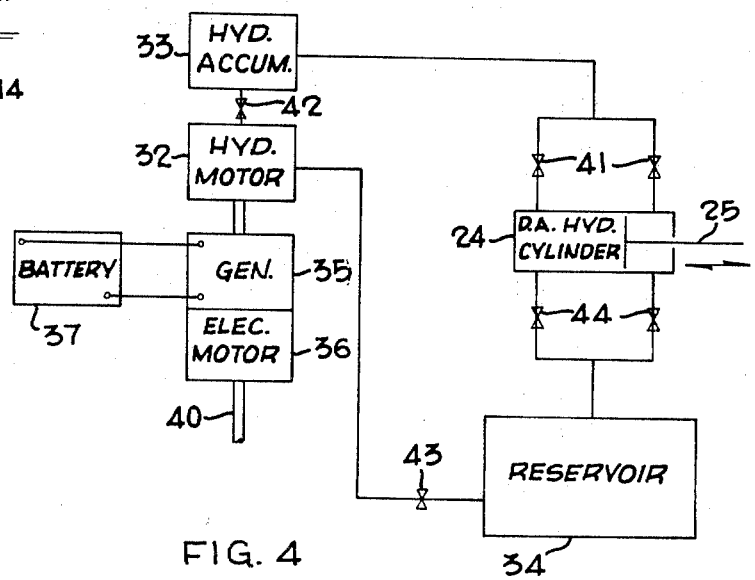
FIG. 4 is a diagrammatic representation of the hydraulic and electrical system.

FIG. 4 is a diagrammatic representation of the power-producing system and, of course, the various control valves 41, 42, 43 and 44 perform the usual cut-off function of such valves and do not require specific description, their use being obvious.

It is thought that the functional advantages of this power-producing means have become fully apparent from the foregoing description of parts, but for convenience of disclosure, the operation of the structure will be briefly described.

There is no time when the ocean is completely still and in general the motion of the water is considerable. In the preferred embodiment wave action and ocean swell may operate effectively against both the fore portion 11 and the aft portion 12 of the hull 10, and the varied nature of ocean swell over an extended distance, makes it inevitable that a differential force will exist, tending to rotate the portions 11 and 12 about the hinge pin 14 relative to each other.

As one portion of the vessel moves relative to the other, it is clear that, because of their rotation about the hinge pin 14, the pivot points represented by shafts 30 and 31 likewise move relative to each other. Because of the plunger and cylinder assembly 24 connected between the shafts 31 and 30, the plunger is retracted into the cylinder as the gap between the hull 10 closes. When this happens, hydraulic fluid is forced into the hydraulic circuit and drives the hydraulic motor 32. The hydraulic accumulator 33 functions in the accustomed manner to insure that the drive is smooth.

A typical vessel size will be considered to appreciate what quantitative forces are involved. The figures referred to below are intended only to be approximate and exemplary and are not to be considered in any way, limiting.

As an example of the forces involved, consider a vessel having a length of 300 feet. Such a vessel will typically have a length to beam ratio of about 1 to 10 which will provide a width of 30 feet. It will be supposed that the draft is say 15 feet. It will be further supposed that the wetted area of such a vessel would be 15,000 square feet.

The power required to drive such a ship is a function of the ship resistance, the velocity of the vessel and the efficiency. The ship resistance is a factor measured in pounds per square foot of wetted area and is equal to the sum of the frictional resistance and the wave resistance. For a vessel of the stated dimensions, the ship resistance will be assumed to be six pounds per square foot of wetted area. Further the velocity will be assumed as 20 knots (33.8 f.p.s.) and the efficiency of the drive 60 percent. The horse power required to propel such a ship is:

$$\text{H.P.} = \frac{R \times V}{550} \times \frac{1}{E}$$

$$= \frac{(6 \times 15,000) \times 33.8}{550} \times \frac{100}{60}$$

$$= 9,000 \text{ approx.}$$

A typical displacement of such a ship would be 5,000 tons. Thus one of the two portions which make up the vessel herein discussed might be assumed as weighing 2,500 tons or 5,000,000 pounds. It will be readily understood that the upward movement of 5,000,000 pounds at the rate of say one foot per second results in a substantial quantity of work done per second, sufficient even to contribute to the propulsion of the vessel.

It is hoped that the above figures give some indication of the enormous forces available as the hull portions 11 and 12 rise and fall, in comparison with the drive power required. By taking advantage of such forces, the natural movement of the sea is utilized in a power medium in much the same way as the wind was utilized in a power medium for sailing ships.

We claim:
1. In an ocean-swell actuated, power-producing means:
 a. a power vessel including front and rear floating portions having face to face adjacent ends, said portions providing a pair of bodies adapted to rise and fall in response to the swell of the ocean;
 b. coupling means attaching the bodies together in pivotal relation including a transverse hinge interconnecting the front and rear portions;
 c. an arm disposed in spaced relation from the coupling means, the arm including opposed ends, one of said ends being connected to one body, the arm moving in response to the relative movement of the bodies;
 d. translation means carried by the other body, the translation means engaging the other end of the arm and translating movement of the arm into power, the translation means and the arm extending between said face to face adjacent ends of the bodies;
 e. the arm including a plunger, substantially longitudinally aligned with the power vessel and having said one end pivotally connected to said one body; and
 f. the translation means including a hydraulic cylinder cooperating with the plunger, the cylinder being pivotally connected to said other body.

2. A power-producing means as defined in claim 1, in which:
 g. a hydraulic circuit receives fluid from the hydraulic cylinder;
 h. the hydraulic circuit includes a hydraulic motor; and
 i. an electric generator is coupled to the hydraulic motor whereby to produce electric power, assisting propulsion of the powered vessel.

3. In an ocean-swell actuated, power-producing means:
 a. an elongate powered vessel including front and rear floating portions having face to face adjacent ends;
 b. hinge means interconnecting the floating portions, the said portions rotating relative to each other in response to the swell of the ocean about a substantially horizontal hinge axis of rotation;
 c. at least two hydraulic plunger and cylinder assemblies disposed in side-by-side relation and extending between the face to face adjacent ends of the front and rear floating portions in spaced vertical relation to the axis of rotation of said hinge means;
 d. at least one transverse shaft mounted to the front portion;
 e. at least one transverse shaft mounted to the rear portion; and
 f. each hydraulic plunger and cylinder assembly including an associated plunger and cylinder, the plunger being pivotally attached to an associated transverse shaft mounted to one of said floating portions in radial relation to the hinge and the cylinder being pivotally attached to an associated transverse shaft mounted to the other of said floating portions in radial relation to the axis of the hinge, the plunger including a piston head received into the cylinder as the front and r rear portions rotate relative to each other about the hinge means.

4. A power-producing means as defined in claim 3, in which:
 g. each hydraulic plunger and cylinder assembly extending substantially longitudinally of the elongate vessel between said transverse shafts.